(12) United States Patent
Lee et al.

(10) Patent No.: US 6,959,754 B2
(45) Date of Patent: Nov. 1, 2005

(54) AIR CONDITIONING SYSTEM FOR A VEHICLE

(75) Inventors: Junkang Lee, Daejeon-si (KR); Changho Park, Daejeon-si (KR); Inchul Han, Daejeon-si (KR); Sunjae Yoo, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 164 days.

(21) Appl. No.: 10/219,747

(22) Filed: Aug. 14, 2002

(65) Prior Publication Data

US 2003/0037918 A1    Feb. 27, 2003

(30) Foreign Application Priority Data

Aug. 22, 2001  (KR) ................ 2001-50592

(51) Int. Cl.[7] ............... F25B 29/00; B60H 1/00; B60H 3/00
(52) U.S. Cl. ............... 165/42; 165/43; 165/202; 165/203; 165/204; 454/156; 454/160; 454/161; 237/12.3 A; 237/12.3 B
(58) Field of Search ............... 165/203, 42, 43, 165/204, 202; 454/156, 160, 161; 237/12.3 A, 237/12.3 B

(56) References Cited

U.S. PATENT DOCUMENTS

| | | | |
|---|---|---|---|
| 4,157,113 A | * 6/1979 | Karran et al. | ........ 165/42 |
| 5,862,677 A | * 1/1999 | Kim et al. | ........ 62/244 |
| 6,145,754 A | 11/2000 | Uemura et al. | |
| 6,206,092 B1 | * 3/2001 | Beck et al. | ........ 165/203 |
| 6,311,763 B1 | * 11/2001 | Uemura et al. | ........ 165/43 |
| 6,640,570 B2 | * 11/2003 | Nishida et al. | ........ 62/244 |
| 6,782,944 B2 | * 8/2004 | Kim et al. | ........ 165/203 |

| | | | |
|---|---|---|---|
| 2003/0000691 A1 | 1/2003 | Kim et al. | |
| 2003/0116303 A1 | 6/2003 | Kang et al. | |
| 2003/0205370 A1 | 11/2003 | Kim | |

FOREIGN PATENT DOCUMENTS

| | | | | |
|---|---|---|---|---|
| JP | 58033509 A | * | 2/1983 | ...... B60H 3/00 |
| JP | 58136813 U | * | 9/1983 | |
| JP | 60-008105 | | 1/1985 | |

(Continued)

Primary Examiner—John K. Ford
(74) Attorney, Agent, or Firm—Fulbright & Jaworski L.L.P.

(57) ABSTRACT

The present invention has been made to solve the foregoing problems and it is an object of the present invention to provide a two-layer flow air conditioning system in which a partition wall is installed on a path between an evaporator and a heater core to divide internal air and external air, and a first temperature adjusting door and a second temperature adjusting door each having a fan shape are installed at both sides of the partition wall in such a manner as to be opened at their sides to control the flow direction of the internal air and the external air which are supplied to both sides of the partition wall so as to prevent any mixture between the internal air and the external air, thereby enhancing heating and cooling effects without degrading a defrosting performance.

It is another object of the invention to provide a two-layer flow air conditioning system in which a first temperature adjusting door and a second temperature adjusting door is operated separately and a horizontal partition wall extends from the rearward of the evaporator to the rearward of a heater core via the heater core so that the cool and warm air having different properties is circulated through separate passages to supply the warm air to the vehicle interior and supply the cool air to a windshield for defrosting or to supply the cool air to the vehicle interior and supply the warm air is supplied to the windshield.

9 Claims, 18 Drawing Sheets

FOREIGN PATENT DOCUMENTS

| | | | | |
|---|---|---|---|---|
| JP | 03010922 A * | 1/1991 | ............ | B60H 1/00 |
| JP | 9024722 | 1/1997 | | |
| JP | 9024723 | 1/1997 | | |
| JP | 9156348 | 6/1997 | | |
| JP | 9240247 | 9/1997 | | |
| JP | 9240248 | 9/1997 | | |
| JP | 10000915 | 1/1998 | | |
| JP | 10016539 | 1/1998 | | |
| JP | 10181336 | 7/1998 | | |
| JP | 10217752 A * | 8/1998 | ............ | B60H 1/00 |
| JP | 11180128 | 7/1999 | | |
| JP | 11208238 | 8/1999 | | |
| JP | 11208240 | 8/1999 | | |
| WO | WO96/29211 A * | 9/1996 | | |

* cited by examiner

Prior Art

AIR CONDITIONING SYSTEM FOR A VEHICLE

BACKGROUND OF THE INVENTION

1. Field of the Invention

The present invention relates to an air conditioning system for vehicles, and more particularly, to a two-layer flow air conditioning system capable of separately blowing internal and external air.

2. Background of the Related Art

Generally in heating a vehicle interior in winter, cold and dry external air is introduced in order to prevent any frost on a windshield, which results in a corresponding decrease in the temperature of the vehicle interior.

In order to solve the above problem, an air conditioning unit is developed to provide two-layer airflow. Such an air conditioning unit realizes two-layer flow of the internal/external air by providing the external air to an upper region of the vehicle interior and circulating the internal air through a lower region of the vehicle interior. The fresh and dry external air provided to the upper region reduces the frost occurring on the windshield to ensure a defrosting performance as well as refreshes a driver and/or a passenger. The warm internal air is provided to the lower region to enhance a heating ability in the vehicle interior.

A typical example of the air conditioning unit for providing the two-layer airflow as above is disclosed in Japanese Patent Publication H10-181336 with its technology as illustrated in FIG. 1.

The air conditioning unit 10 with the above two-layer air flowing system has a first blower fan 30 and a second blower fan 31 each installed in an external air inlet port 22 and an internal air inlet port 23 of an air conditioning case 20 separated by a partition 21.

Inside the air conditioning case 20, an evaporator E and a heater core H are respectively installed toward the inside of the air conditioning case 20 from internal/external air inlet ports 22 and 23 with a certain interval. In front of the heater core H, are installed first and second temperature adjusting doors 40 and 41 for selectively opening/closing an exit 24 in the upper front thereof. In the rear of the heater core H, is installed a baffle 50 substantially shaped as a section of the air conditioning case 20 for partitioning a region in the rear of the heater core H into the first and second flow passages P1 and P2.

In an upper inward side of the baffle 50, is installed a third temperature adjusting door 42 for opening/closing the first flow passage P1 between the heater core H and the baffle 50. In the inside wall of the air conditioning case 20 opposite to the upper end of the baffle, is installed the first floor door 43 for opening/closing an upper gate of the second flow passage P2. In the lower end of the baffle 50, is installed a second floor door 44 a free end of which comes into contact with a central portion of the heater core H or a baffle 44a for selectively opening/closing the first flow passage P1 or a floor opening 25.

In the second temperature adjusting door 41, its rear end is rotatably installed at a substantially middle height of the heater core H to open/close the heater core H from a central portion thereof to a lower portion thereof. The free end of the second temperature adjusting door 41 is arranged in a substantially middle portion of the evaporator E opposite to the partition wall 21 to separate the internal/external air.

In the first temperature door 40, its rear end is rotatably installed at the upper end of the heater core H and its free end is superposed on a baffle 24a of the above exit 24 or on the second temperature adjusting door 41 to selectively open/close the heater core H from the central portion to an upper portion or the above exit 24. Herein, the first and second temperature adjusting doors 40 and 41 cooperate with each other while being rotated by one actuator.

The undescribed reference numerals 26 and 27 each designate a defroster opening and a face opening, and 26a and 27a each designate a defroster opening door and a face opening door for respectively opening/closing the defroster opening and the face opening.

The operation of the air conditioning unit having the two-layer air flow system of such a conventional prior art will be described in detail hereinafter.

When a warm mix mode is selected, the first and second temperature adjusting doors 40 and 41 are disposed as thick lines while the first temperature adjusting door 40 shuts the exit 24 above the heater core H to open the heater core H from the central portion thereof to the upper portion thereof as well as the second temperature adjusting door 41 opens the heater core H from the central portion thereof to the lower portion thereof. The third temperature adjusting door 42 opens the first flow passage P1 in the rear of the heater core H while the first floor door 43 shuts the second flow passage P2. In the second floor door 44, its free end is directed toward the central portion of the heater core H to open the floor opening 25 while closing the lower portion of the first flow passage P1.

Herein, the second temperature adjusting door 41 and the second floor opening door 44 function as partition walls for dividing the inside of the air conditioning case 20 into an external air layer section in the upper region thereof and an internal air layer section in the lower region thereof.

The operation of the doors as above defines a two-layered airflow passage of upper and lower portions within the air conditioning case 20. Due to the compulsive blowing force of the blower fans 30 and 31, the external air passes through an upper portion of the evaporator E to flow along above the second temperature door 41 toward the heater core H. After passing through the heater core H, the external air is discharged from the defroster opening 26. The internal air passes through a lower portion of the evaporator E to flow along under the second temperature door 41 toward the heater core H. After passing through the heater core H, the internal air is discharged from the floor opening 25 as guided by the second floor door 44. However, the conventional air conditioning unit for providing the two-layer airflow has the following problems.

Since the second temperature adjusting door 41 guiding separation of the internal/external air while opening/closing the front of the heater core H performs the opening/closing operation while rotating about its rear end, the evaporator E is necessarily arranged at a position beyond a trace of the second temperature adjusting door 41, drawn due to rotation, so as to avoid any interference in rotation of the second temperature adjusting door 41. This inevitably leaves a gap G between the evaporator E and the free end of the second temperature adjusting door 41.

In the mix mode, the gap G causes the humid internal air, which passed through the lower portion of the partition wall 21, to leak into the upper section where the external air flows. This elevates the humidity of the external air to remarkably degrade the defrosting performance. Further, this internal air leakage remarkably lowers a heating eff0ect.

In the meantime, the conventional two-layer air conditioning system simply supplies the internal/external air introduced into the air conditioning case 20 through the selected opening or vent but fails to simultaneously supply the cold air and the warm air which have respectively passed through the evaporator E and the heater core H, thereby deteriorating the comfort within the vehicle.

Further, a general air control process is performed by 5 modes including Face, Bi-Level, Floor, Mix and Defrost Modes. Since the second floor door 44 is opened in a warm mode but the second floor door 44 is closed to prevent any heat-exchange with the heater core H in a cool mode, in the above five modes, the floor mode for opening the floor door 44 is divided into two modes for closing the floor opening 44 in cooling and opening the floor opening door 44 in heating and the mix mode is also divided into two modes for closing and opening the floor opening 44. This makes the entire air control process into seven modes, thereby sophisticating the entire mode control structure.

SUMMARY OF THE INVENTION

Accordingly the present invention has been made to solve the foregoing problems and it is an object of the present invention to provide a two-layer flow air conditioning system in which a partition wall is installed on a path between an evaporator and a heater core to divide internal air and external air, and a first temperature adjusting door and a second temperature adjusting door each having a fan shape are installed at both sides of the partition wall in such a manner as to be opened at their sides to control the flow direction of the internal air and the external air which are supplied to both sides of the partition wall so as to prevent any mixture between the internal air and the external air, thereby enhancing heating and cooling effects without degrading a defrosting performance.

It is another object of the invention to provide a two-layer flow air conditioning system in which a first temperature adjusting door and a second temperature adjusting door is operated separately and a horizontal partition wall extends from the rearward of the evaporator to the rearward of a heater core via the heater core so that the cool and warm air having different properties is circulated through separate passages to supply the warm air to the vehicle interior and supply the cool air to a windshield for defrosting or to supply the cool air to the vehicle interior and supply the warm air is supplied to the windshield.

Further, the temperature adjusting doors are installed in front and the rear of the heater core with compact constructions for guiding the cool and warm air to openings so that each air control mode can be simply performed.

According to an aspect of the invention to obtain the above objects, it is provided an air conditioning system comprising: an air conditioning case having an entrance section divided into an external air inlet port and an internal air inlet port and an exit section which includes a defroster opening, a face opening and a floor opening; an evaporator and a heater core provided in sequence inside the air conditioning case with certain intervals from the external and internal air inlet ports; a partition wall extending from the rear of the evaporator via the heater core to the rear of the heater core within the air conditioning case for dividing the inside of the air conditioning case into upper and lower sections; a blower fan having first and second fans installed on the side of the internal and external air inlet ports of the air conditioning case for forcibly blowing the internal and external air to the evaporator and the heater core; first and second temperature adjusting doors provided respectively in the upper and lower portions of the partition wall between the evaporator and the heater core for opening/closing a front space of the heater core; and third and fourth temperature adjusting doors provided respectively above and under the partition wall for opening/closing a rear space of the heater core.

Alternatively, a structure can be devised to perform a simple air controlling mode, in which the first and second temperature adjusting doors are rotatably installed in a cooperating manner for opening/closing the front space of the heater core while the rear space of the heater core is opened/closed by only a third temperature adjusting door.

That is to say, according to another aspect of the invention to obtain the above objects, it is also provided An air conditioning system comprising: an air conditioning case having an entrance section divided into an external air inlet port and an internal air inlet port and an exit section which includes a defroster opening, a face opening and a floor opening; an evaporator and a heater core provided in sequence inside the air conditioning case with certain intervals from the external and internal air inlet ports; a partition wall extending from the rear of the evaporator via the heater core to the rear of the heater core within the air conditioning case for dividing the inside of the air conditioning case into upper and lower sections; a blower fan having first and second fans installed on the side of the internal and external air inlet ports of the air conditioning case for forcibly blowing the internal and external air to the evaporator and the heater core; first and second temperature adjusting doors rotatably installed respectively in a cooperative engagement manner in the upper and lower portions of the partition wall between the evaporator and the heater core for opening/closing a front space of the heater core; and a third temperature adjusting door provided under the partition wall for opening/closing a rear space of the heater core.

BRIEF DESCRIPTION OF THE DRAWINGS

The above and the other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
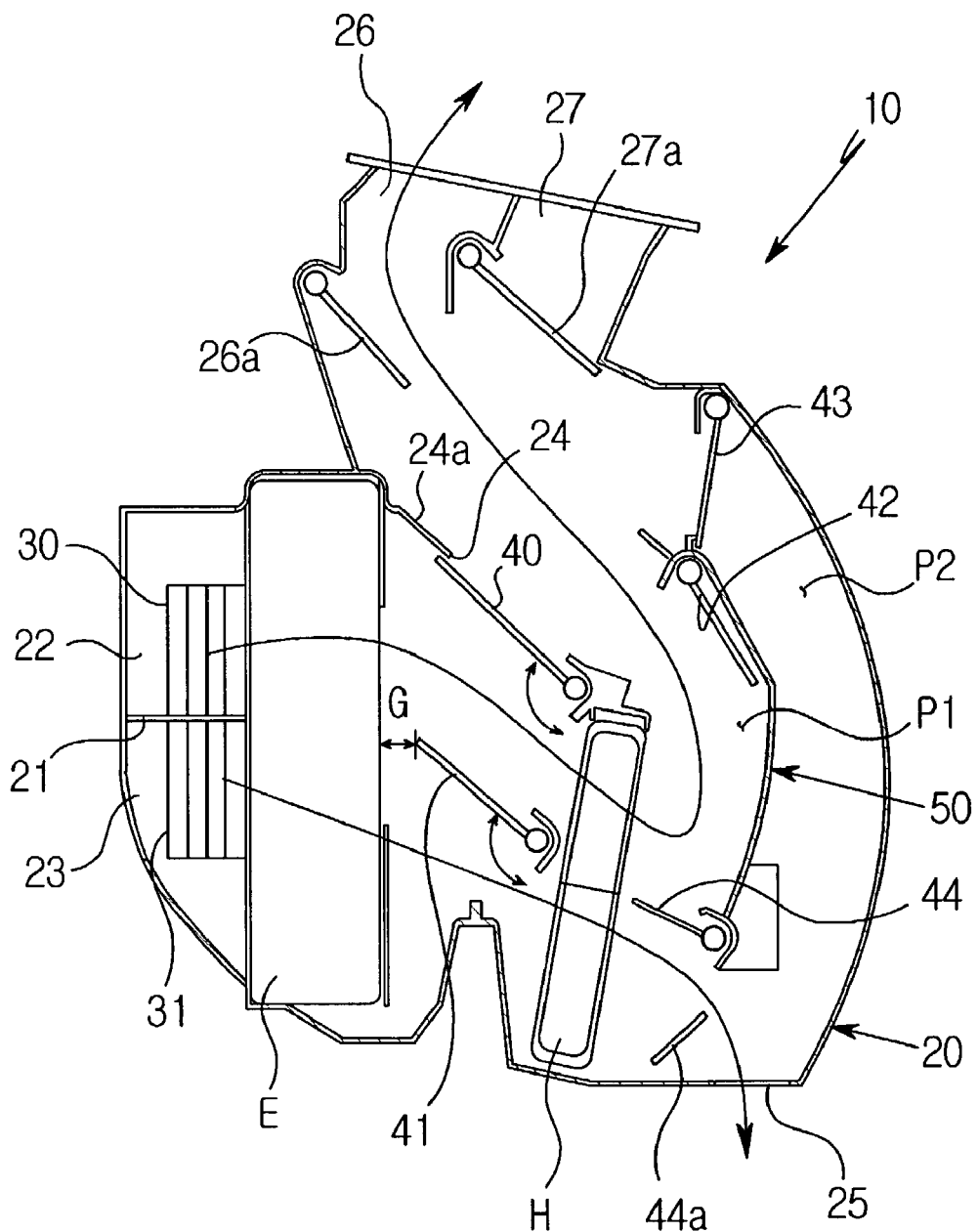
FIG. 1 is a sectional view illustrating the structure and operation of a general air conditioning system.
Figure 2:
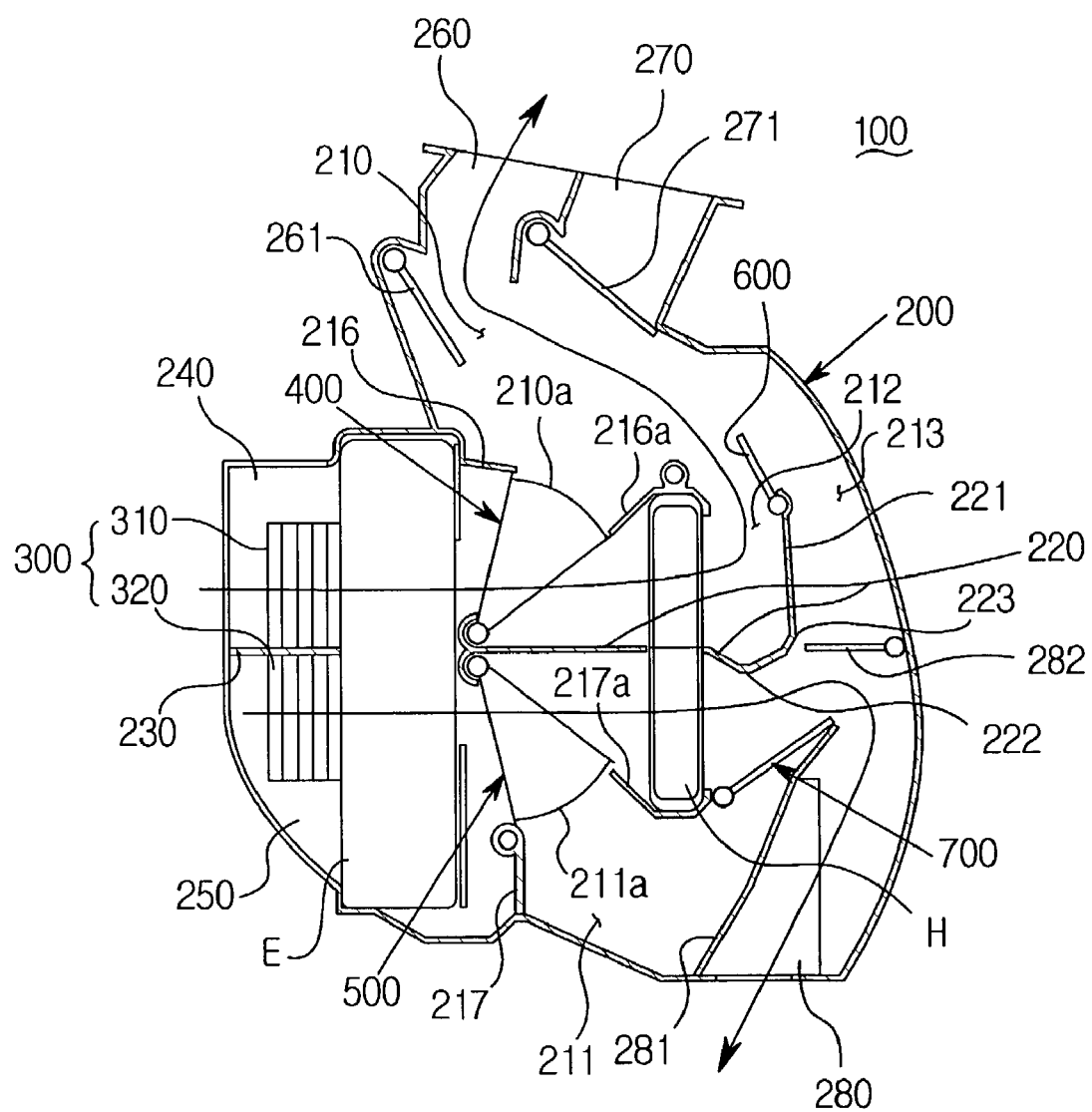
FIG. 2 is a sectional view illustrating the structure of an air conditioning system according to a preferred embodiment of the present invention.
Figure 3:
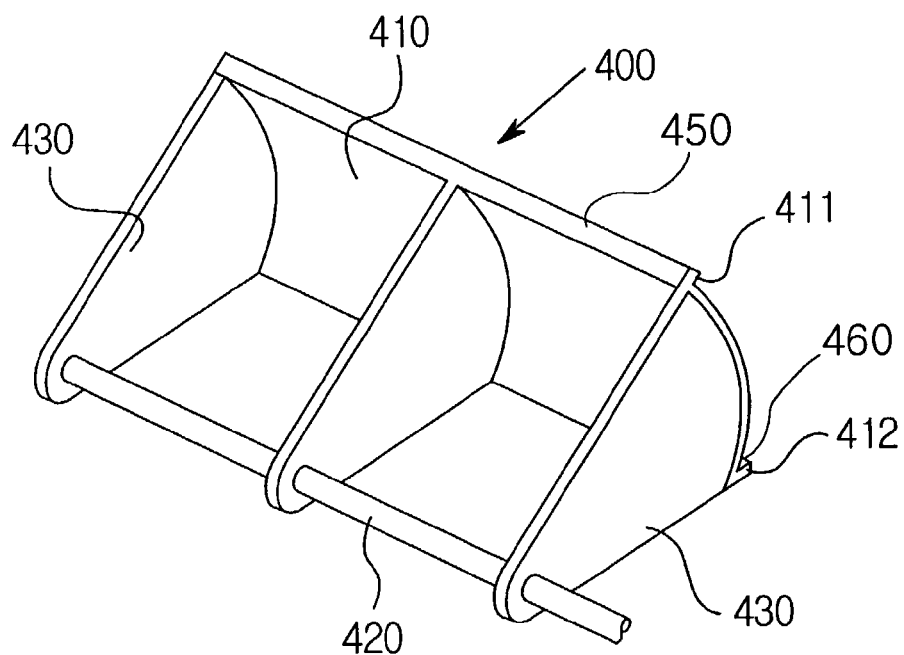
FIG. 3 is a perspective view illustrating a temperature adjusting door of the air conditioning system shown in FIG. 2.

As shown in FIGS. 2 and 3, a two-layer flow air conditioning system 100 of the invention has a blower fan 300, which is installed on the entrance side of an air conditioning case 200 for forcibly blowing the air into a vehicle interior, and an evaporator E and a heater core H each installed in the rear of the blower fan in such a manner as to be spaced apart from each other by a certain interval.

The air conditioning case 200 has a partition wall 220 installed within the same for dividing the inside of the air conditioning case 200 into a first flow passage 210 functioning as an upper external air flow section and a second flow passage 211 functioning as a lower internal air flow section. Above and under the partition wall 220 in the rear of the heater core H, are respectively installed third and fourth temperature adjusting doors 600 and 700 which are separately operated to open/close the rear of the heater core H.

Further, the air conditioning case 200 has a partition 230 which is installed in a front portion thereof with substantially the same height as that of the partition wall 220 for separating an upper external air inlet port 240 and a lower internal air inlet port 250. In an upper portion of the air conditioning case 200, are respectively provided a defroster opening 260 and a face opening 270. In a lower rear portion of the air conditioning case 200, are provided a floor opening 280 which is defined by a rear inner wall of the air conditioning case 200 and a baffle 281 spaced inwardly apart from the rear inner wall thereof and a lower end of which is opened downwardly.

The blower fan 300 is halved into a first fan 310 and a second fan 320. The first fan 310 is installed on the side of the external air inlet port 240 above the partition 230 for blowing the air into the first flow passage 210. The second fan 320 is installed on the side of the internal air inlet port 250 under the partition 230 for blowing the air into the second flow passage 211.

The first and second fans 310 and 320 may be constituted of two separate fans or a unitary fan which is halved into upper and lower sections.

The partition wall 220 horizontally extends from a substantially central portion of the rear side of the evaporator E via a central portion of the heater core H to an internal space of the air conditioning case 200 in the rear of the heater core H, and is provided in its rear end with a perpendicularly extending section 221 which is extending upwardly toward the face opening 270.

The perpendicularly extending 221 of the partition wall 220 divides the internal space of the air conditioning case 200 in the rear of the heater core H into a third flow passage 212 and a fourth flow passage 213. The partition wall 220 has a downwardly bent block 222 which is installed just in the rear of the heater core H and is in contact with a free end of the fourth temperature adjusting door 700.

First and second temperature adjusting doors 400 and 500 are rotatably coupled at their front ends to one end of the partition wall 220 in such a manner as to disposed above and under the partition wall 220 between the evaporator E and the heater core H to selectively open/close a front space of the heater core H, the upper and lower portions of the heater core H and entrances 210a and 211a of the first and second flow passages 210 and 211. The evaporator E is provided with baffles 216 and 217 at its rear upper and lower ends and the heater core H is provided with baffles 216a and 217a at its front upper and lower ends so that the first temperature adjusting door 400 is in contact at its free end with the baffles 216 and 216a and the second temperature adjusting door 500 is in contact at its free end with the baffles 217 and 217a during the opening/closing operation thereof.

The first temperature adjusting door 400, as shown in FIG. 3, is constituted of an arc-shaped shutter member 410 for closing the airflow and fan-shaped side plates 430 which are perpendicularly extended from the front portion of the shutter member 410 in such a manner as to be spaced apart from each other by a certain interval and ends of which are rotatably mounted on a rotary shaft 420. The first temperature adjusting door 400 is rotatably installed in the upper portion of the partition wall 220 between the evaporator E and the heater core H via the rotary shaft 420.

The shutter member 410 is provided at the upper and lower ends with anti-leak ribs 450 and 460 along a longitudinal direction thereof so that the air may not leak between the shutter member 410 and the baffles 216 and 216a. Since the second temperature adjusting door 500 has the same structure as the first temperature adjusting door 400, its detail description and drawing will be omitted hereinafter.

In the anti-leak ribs 450 and 460, the first rib 450 can be made longer than the second rib 460 so as to effectively prevent any leakage of the air by sufficiently ensuring the length of the first rib 450 as well as reduce the distance between the evaporator E and the heater core H by shortening the second rib 460.

In the meantime, the baffles 216, 216a, 217 and 217a in contact with the ribs 450 and 460 are provided with location sensors (not shown) to control the operations of the temperature adjusting doors 400 and 500 so that the temperature adjusting doors 400 and 500 stop when the ribs 450 and 460 in contact with the baffles 216, 216a, 217 and 217a.

Figure 4:
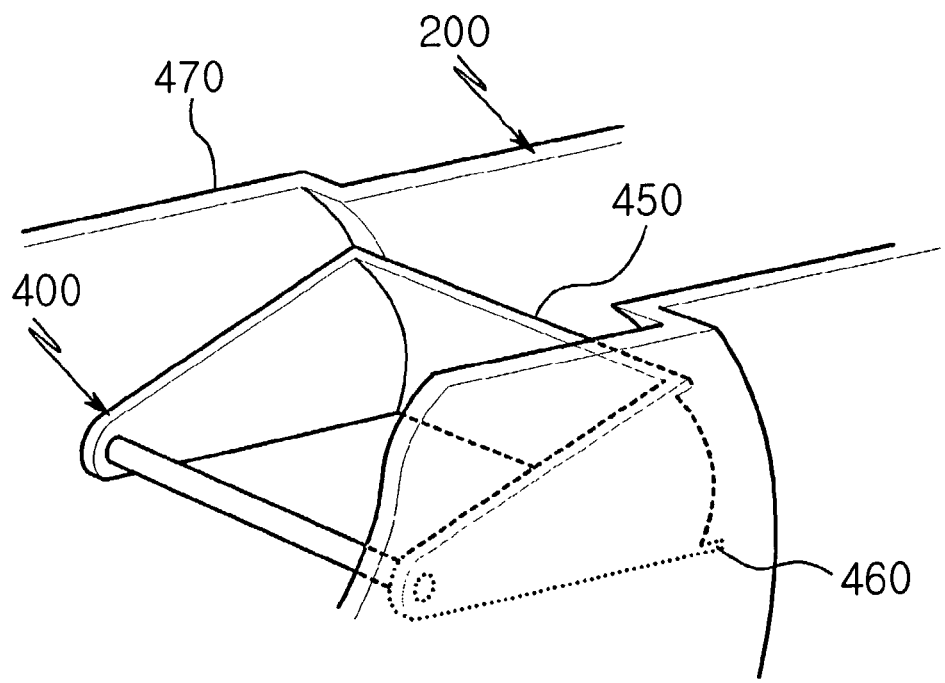
FIG. 4 is a perspective sectional view illustrating a portion of an air conditioning case corresponding to FIG. 3.

Further, as can be seen from FIG. 4, the air conditioning case 200 is provided with a door mounting section 470 shaped as an arc along traces of rotation of the first and second temperature adjusting doors 400 and 500. The door mounting section 470 may be wider than other sections of the air conditioning housing 200.

Figure 5:
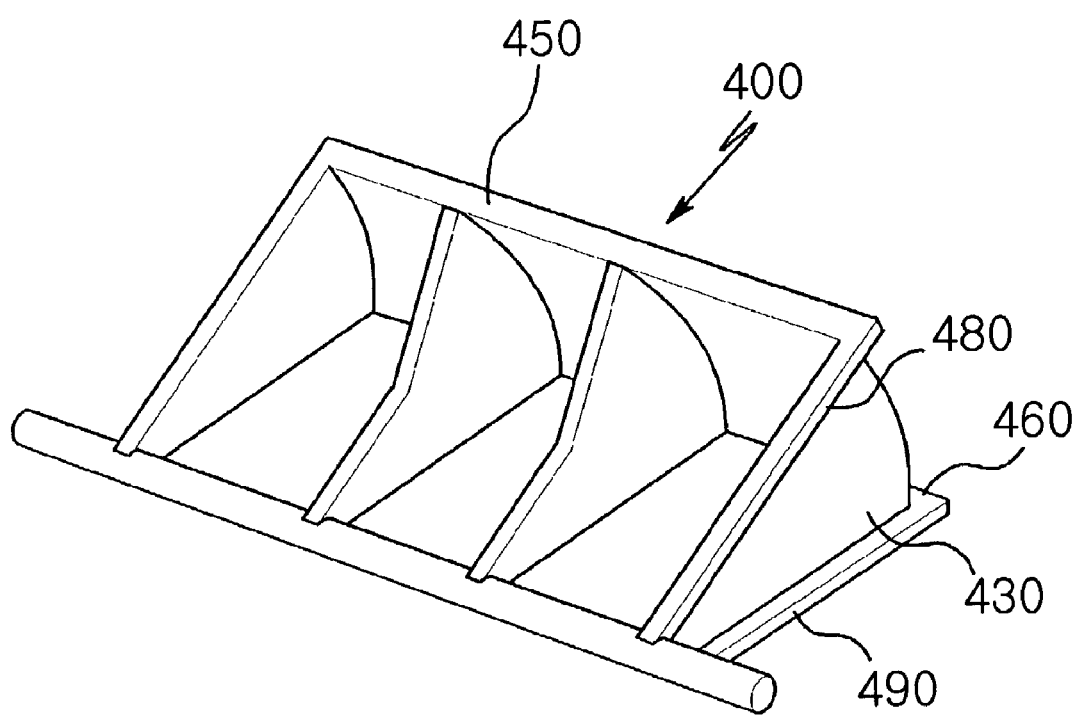
FIG. 5 is a perspective view illustrating an alternative embodiment of the temperature adjusting door shown in FIG. 3.
Figure 6:
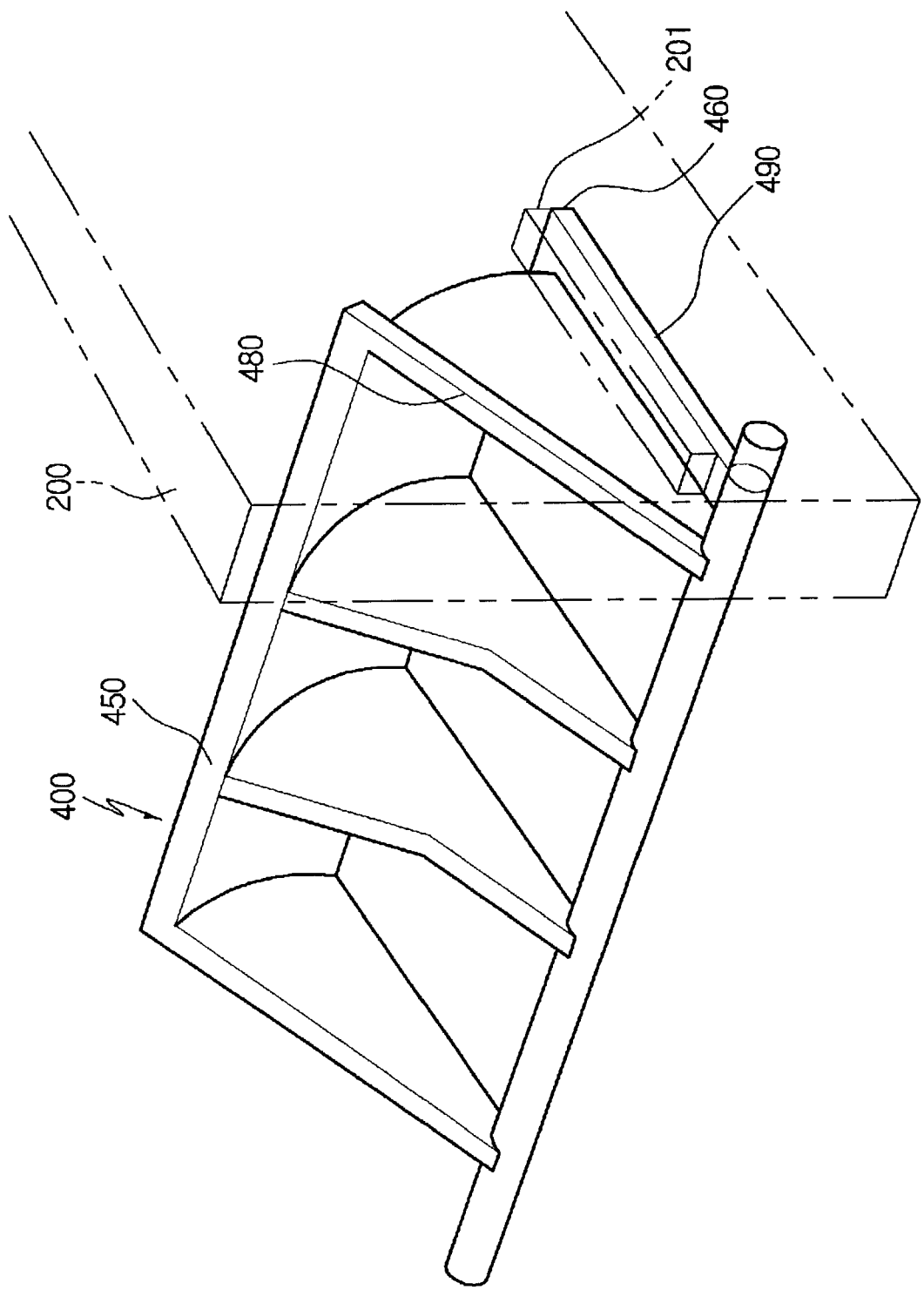
FIG. 6 is a perspective view illustrating an air conditioning system adopting the temperature adjusting door shown in FIG. 3.

In a temperature adjusting door 400 shown in FIG. 5, anti-leak ribs 480 and 490 each are outwardly projected from edges in the peripheries of the side plates 430. As shown in FIG. 6, the air conditioning case 200 is provided at both wall sides with anti-leak ribs 201 for being in contact with the anti-leak ribs 480 and 490 to prevent any leakage when the temperature adjusting door 400 is moved to open/close the front space of the heater core H.

The anti-leak ribs 480 and 490 are connected to the anti-leak ribs 450 and 460 of the air shutter member 410.

The ribs 450, 460, 480 and 490 are unintermittently formed along the upper and lower ends of the air shutter member 410 and the side plates 430 so that the air may not leak between the side walls of the air conditioning case 200 and the side plates 430 of the temperature adjusting door 400.

Figure 7:
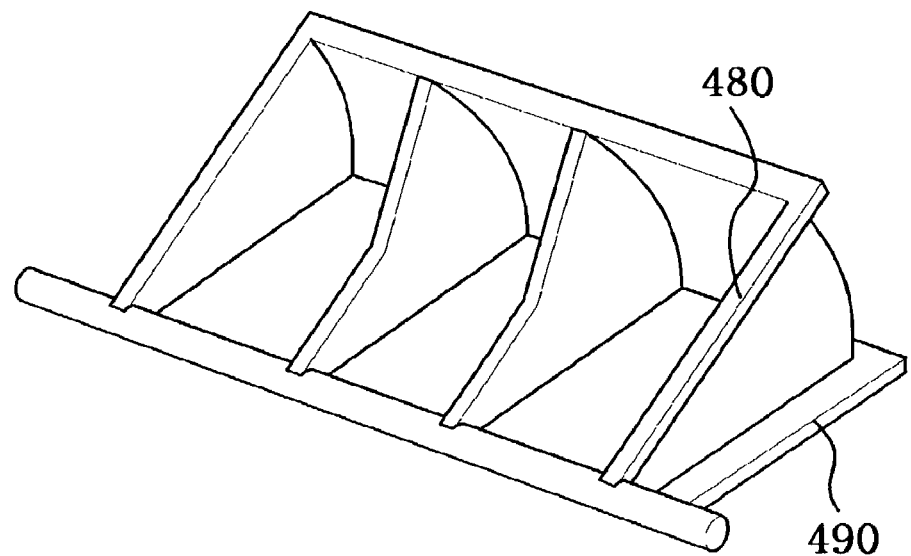
FIG. 7 is a perspective view illustrating another alternative embodiment of the temperature adjusting door shown in FIG. 3.
Figure 8:
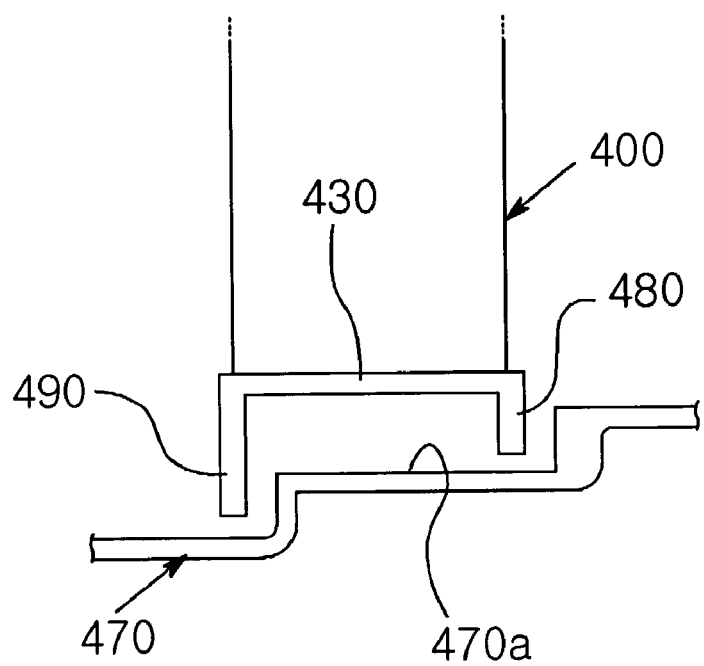
FIG. 8 is a sectional view of the air conditioning case adopting the temperature adjusting door shown in FIG. 7.

Further, as shown in FIGS. 7 and 8, the anti-leak ribs 480 and 490 installed on the side plates 430 of the temperature adjusting door 400 can have their own lengths different from each other. The door mounting section 470 of the air conditioning case 200 is provided with steps 470a at both sidewalls of the air conditioning case 200 so that the anti-leak ribs 480 and 490 with the different lengths can be in contact with the inner sides of the door mounting section 470 due to rotation of the temperature adjusting door 400. This allows the ribs 480 and 490 of the temperature adjusting door 400 to abut on thresholds of the steps 470a thereby preventing any leakage of the air.

The first and second temperature adjusting doors 400 and 500 are respectively controlled by separate actuators.

In the meantime, as will be described hereinafter in an alternative embodiment, the first and second temperature adjusting doors are cooperatively assembled by interlocking means to selectively open/close the front space of the heat core H and the first and second flow passages 210 and 211 provided above and under the heater core H.

The third temperature adjusting door 600 is rotatably installed at the upper end of the perpendicularly extending section 221 of the partition wall 220 with its free end being in contact with the upper face of the rear face of the heater core H to open/close the third flow passage 212 in the rear of the heater core H and above the partition wall 220.

The fourth temperature adjusting door 700 is rotatably coupled to the lower end of the rear face of the heater core H and is in contact at its free end with the downwardly bent block 222 installed just in the rear of the heater core H or the baffle 281 on the floor opening side to selectively open a space under the partition wall 220 in the rear of the heater core H or the second flow passage 211 under the heater core H.

The third and fourth temperature adjusting doors 600 and 700 are preferably of a plate shape.

A floor door 282 for opening/closing the floor opening 280 has one end rotatably coupled to the inner side of the air conditioning case 200 and a free end in contact with the baffle 281 on the floor opening side or spaced apart from the lower end 223 of the perpendicularly extending section 221 in the partition wall 220 by a slight gap when rotating (refer to a floor mode in FIG. 11) in order to selectively open/close the floor opening 280 and the fourth flow passage 213.

The undescribed reference numeral 261 designates a defroster opening door, and 271 designates a face opening door.

Now, an explanation on the operation of the above structured air conditioning system of the present invention will be given in detail hereinafter according to the following mode.

A. Mix Mode

FIG. 2 is a schematic view of an air conditioning unit illustrating the airflow in a warm mix mode.

In the mix mode, the external air is ejected through the defroster opening 260 and the internal air is ejected through the floor opening 280.

Upon selection of the warm mix mode, the free ends of the first and second temperature adjusting doors 400 and 500 are in contact with the baffles 216, 216a, 217 and 217a at the upper and lower ends of the evaporator E and the heater core H to close the entrances 210a and 211a of the first and second flow passages 210 and 211, thereby naturally opening the front space of the heater core H. At the same time, the free end of the third temperature adjusting door 600 is detached from the upper end of the heater core H to open the third flow passage 212 in the rear of the heat core H. The free end of the fourth temperature adjusting door 700 is in contact with the baffle 281 on the side of the floor opening in the rear of the heat core H to open a rear space of the heater core H under the partition wall 220 while closing the second flow passage 211 under the heater core H. The external and internal air blown by the first and second fans 310 and 320 is heated while passing through the heater core H. The heated external air is ejected through the defroster opening 260, and the heated internal air is ejected through the floor opening 280.

In a cooling mix mode, the first and second temperature adjusting doors 400 and 500 close the front space of the heater core H while the third and fourth temperature adjusting doors 600 and 700 close the rear space of the heater core H.

Therefore, after passing through the evaporator E, the air passes through the first and second flow passages 210 and 211 without passing through the heater core H and then is ejected through the defroster opening 260 and the floor opening 280.

B. Recirculated Cool Face Mode

Figure 9:
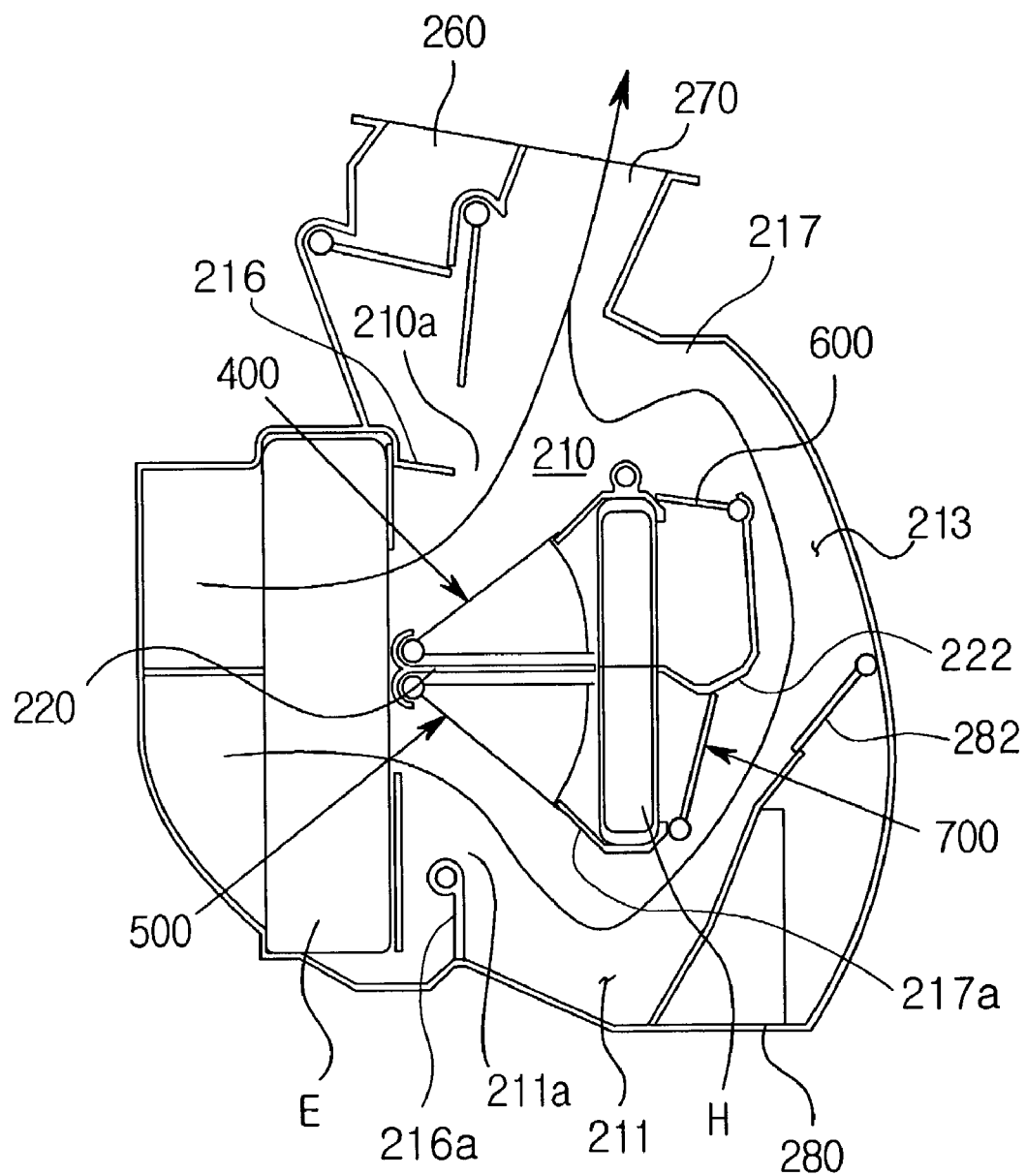
FIG. 9 is a sectional view illustrating the air conditioning system shown in FIG. 2, in which the air flow is formed in a cool-opening mode.

FIG. 9 shows the airflow according to a recirculated-cool-face mode of the internal air. Upon of the cool-face mode, only the face opening 270 is opened but the other openings 260 and 280 are shut. At the same time, the first and second temperature adjusting doors 400 and 500 close the front space of the heater core H while opening the entrances 210a and 211a of the first and second flow passages 210 and 211.

Further, the free end of the third temperature adjusting door 600 in the rear of the heater core H is in contact with the upper end of the rear face of the heater core H while the free end of the fourth temperature adjusting door 700 is in contact with the downwardly bent block 222 of the partition wall 220 just in the rear of the heater core H to also close the rear space of the heater core H.

Therefore, after passing through the evaporator E, the air above the partition wall 220 passes through the first flow passage 210 via the entrance 210a of the first flow passage 210 and then is ejected through the above face opening 270, while the air under the partition wall 220 passes through the second flow passage 211 under the heater core H and the fourth flow passage 213 and then is ejected through the face opening 270 together with the air above the partition wall 220 in the first flow passage 210.

In the heating face mode, the first and second temperature adjusting doors 400 and 500 open the heater core H while closing the entrances 210a and 211a of the first and second flow passages 210 and 211, and the third and fourth temperature adjusting doors 600 and 700 open the rear space of the heater core H so that the upper and lower air is ejected through the face opening 270 after passing through the heater core H.

C. Recirculated ½ Cool Bi-Level Mode

Figure 10:
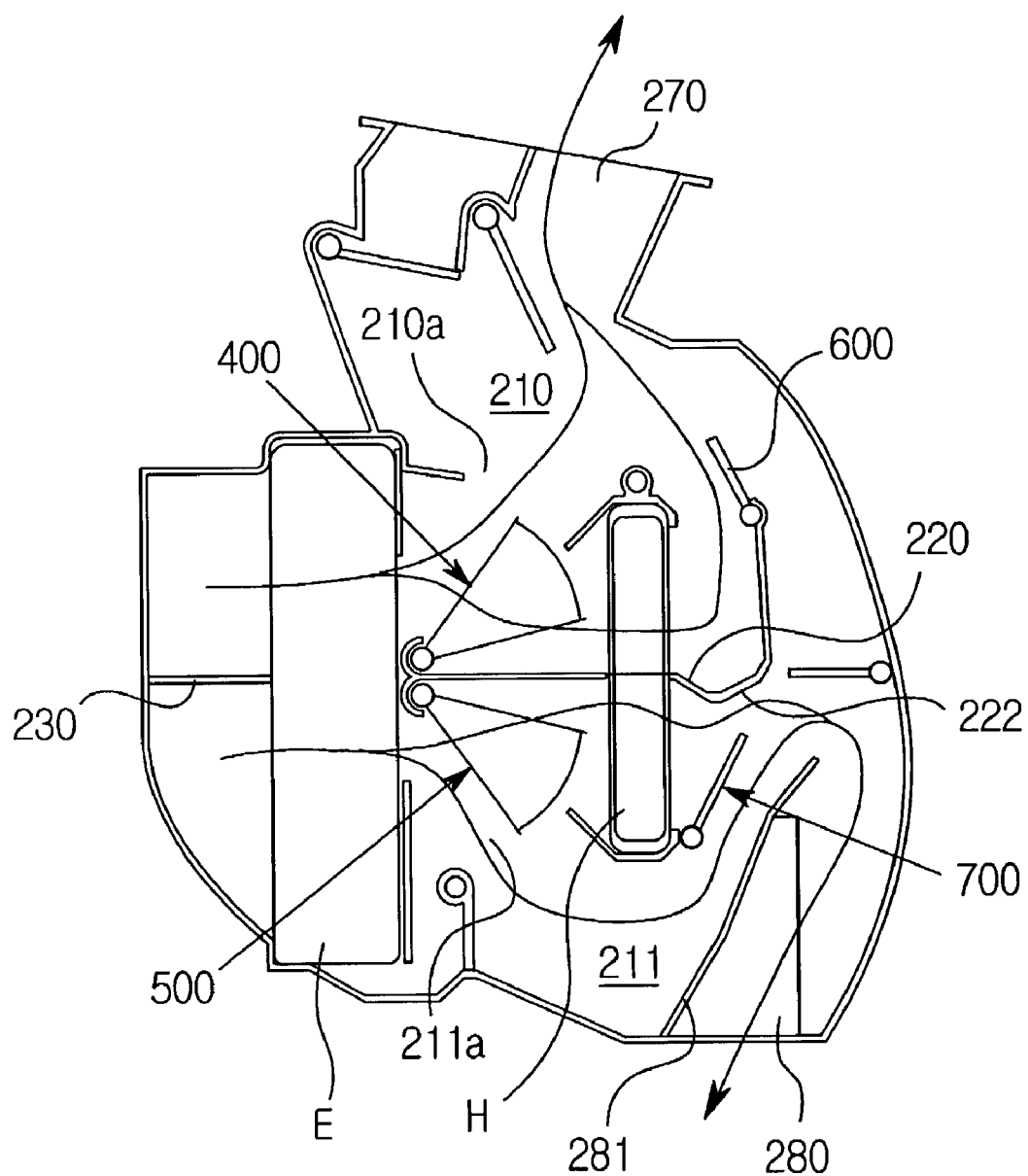
FIG. 10 is a sectional view illustrating the air conditioning system shown in FIG. 2, in which the air flow is formed in a recirculated cool ½ bi-level mode.

Upon selection of a bi-level mode, as can seen from FIG. 10, the first and second temperature adjusting doors 400 and 500 open substantially by halves the entrances 210a and 211a of the first and second flow passages 210 and 211 and the front space of the heater core H, the third temperature adjusting door 600 opens the rear space of the heater core H above the partition wall 220 and the fourth temperature adjusting door 600 is arranged at its free end substantially in the middle between the downwardly bent block 222 of the partition wall 220 and the baffle 281 on the side of the floor opening. The air cooled by passing through the evaporator E and the air heated by passing through the heater core H are mixed in the first and second flow passages 210 and 211, respectively, so that the mixed air each has a temperature higher than that of the air cooled by passing through the evaporator E but lower than that of the air heated by passing through the heater core H to be ejected through the face opening 270 and the floor opening 280. The same process takes place to the air, which passes through the second flow passage 211 and then is ejected through the floor opening 280.

D. Fresh Warm Floor Mode

Figure 11:
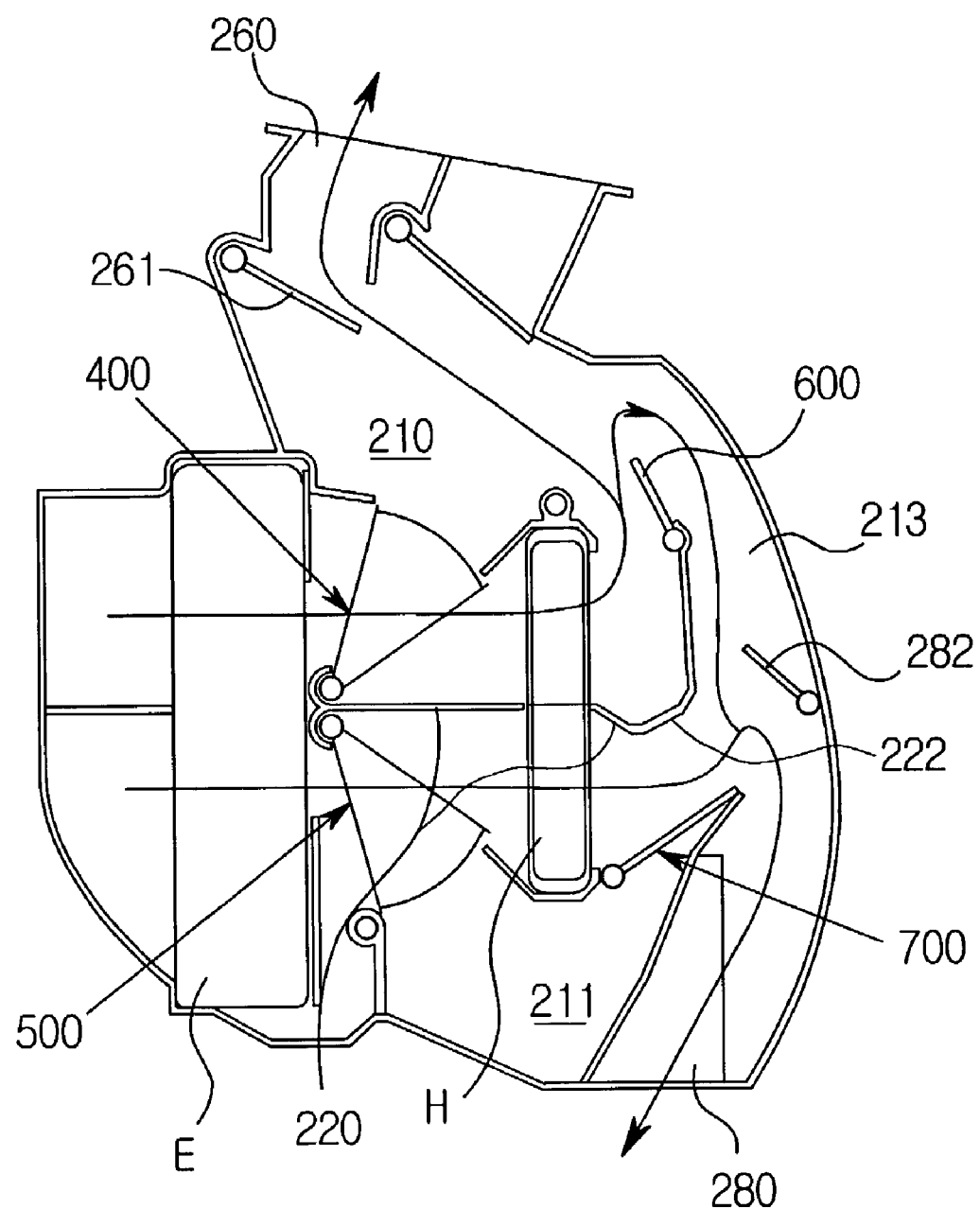
FIG. 11 is a sectional view illustrating the air conditioning system shown in FIG. 2, in which the air flow is formed in a fresh warm floor mode.

FIG. 11 shows the airflow in a warm floor mode, in which the floor opening 280 ejects about 70 to 80% of the introduced air and the defroster opening 260 ejects about 20 to 30% of the introduced air.

Upon selection of the warm floor mode, the first and second temperature adjusting doors 400 and 500 close the entrances 210a and 211a of the first and second flow passages 210 and 211 while completely opening the front space of the heater core H. The third and fourth temperature adjusting doors 600 and 700 open the rear space of the heater core H. The free end of the floor door 282 is placed in the fourth flow passage 213 to open the fourth flow passage 213 about 30%. The defroster opening 260 is opened about half.

After passing through the lower portion of the heater core H, the air is ejected through the floor opening 280. The upper air is partially ejected through the defroster opening 260. However, since defroster opening 260 has a lower degree of opening, the static pressure above the partition wall 220 is lower than that under the partition wall 220. Due to the difference between the static pressures in upper and lower spaces, the remaining portion of the upper air is ejected through the floor opening 280 after flowing along the fourth flow passage 213.

Upon selection of a cool-floor mode, the first to fourth temperature adjusting doors 400, 500, 600, 700 close both of the front and rear spaces of the heater core H, thereby causing the openings 260 and 280 to eject the air which is cooled while passing through the evaporator E.

E. Fresh Warm Defrost Mode

Figure 12:
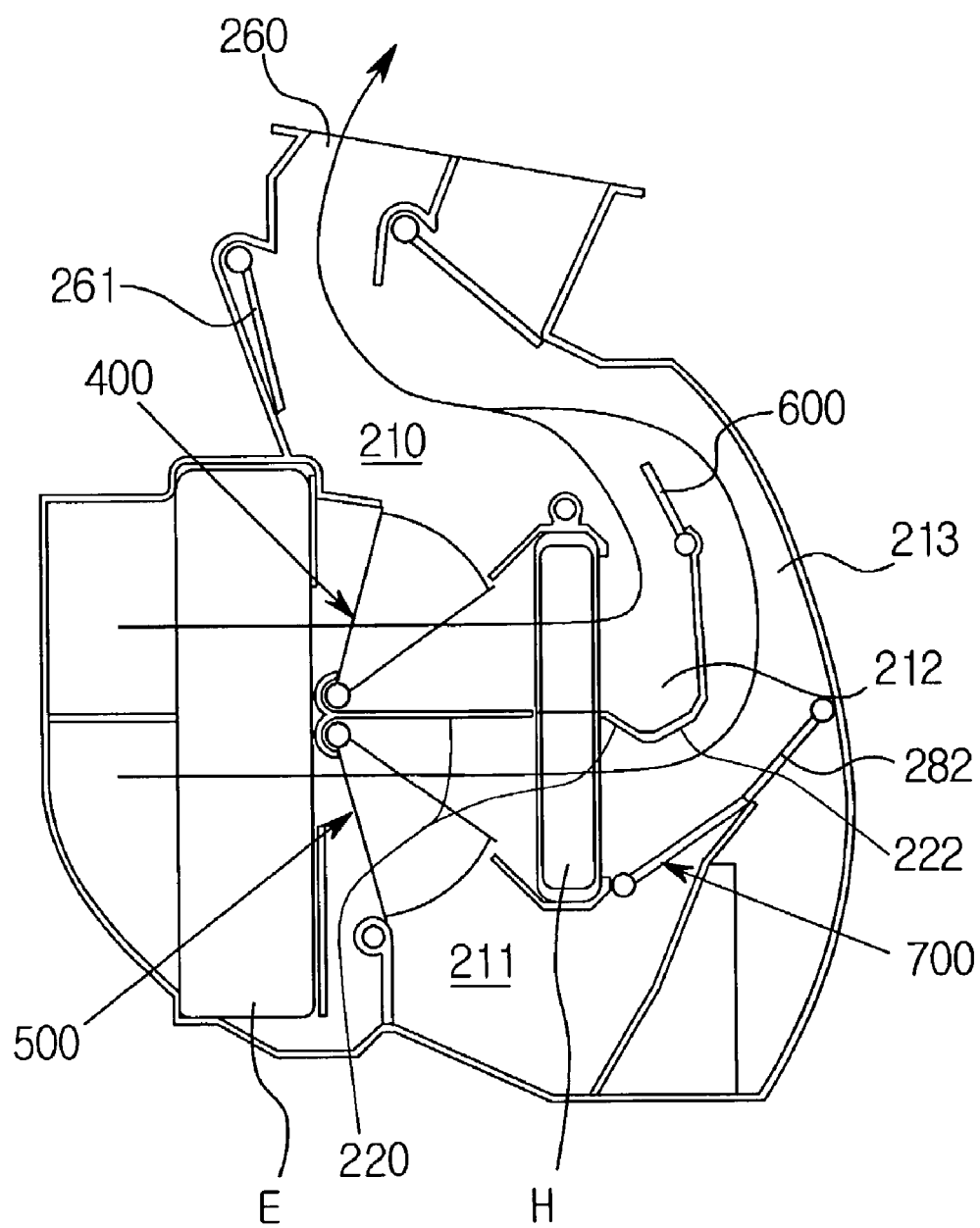
FIG. 12 is a sectional view illustrating the air conditioning system shown in FIG. 2, in which the air flow is formed in a fresh warm defrost mode.

FIG. 12 shows the air flow in a warm defrost mode. Upon selection of the warm-defrost mode, the first and second temperature adjusting doors 400 and 500 open the front space of the heater core H while closing the entrances 210a and 211a of the first and second flow passages 210 and 211. The third and fourth temperature adjusting doors 600 and 700 open the rear space of the heater core H. Heated while passing through the heater core H, the warm air flows, respectively, along the third and fourth flow passages 212 and 213 to join together at the first flow passage 210. The joined air is ejected through the defroster opening 260.

F. Cool-Warm Mix Mode

Figure 13:
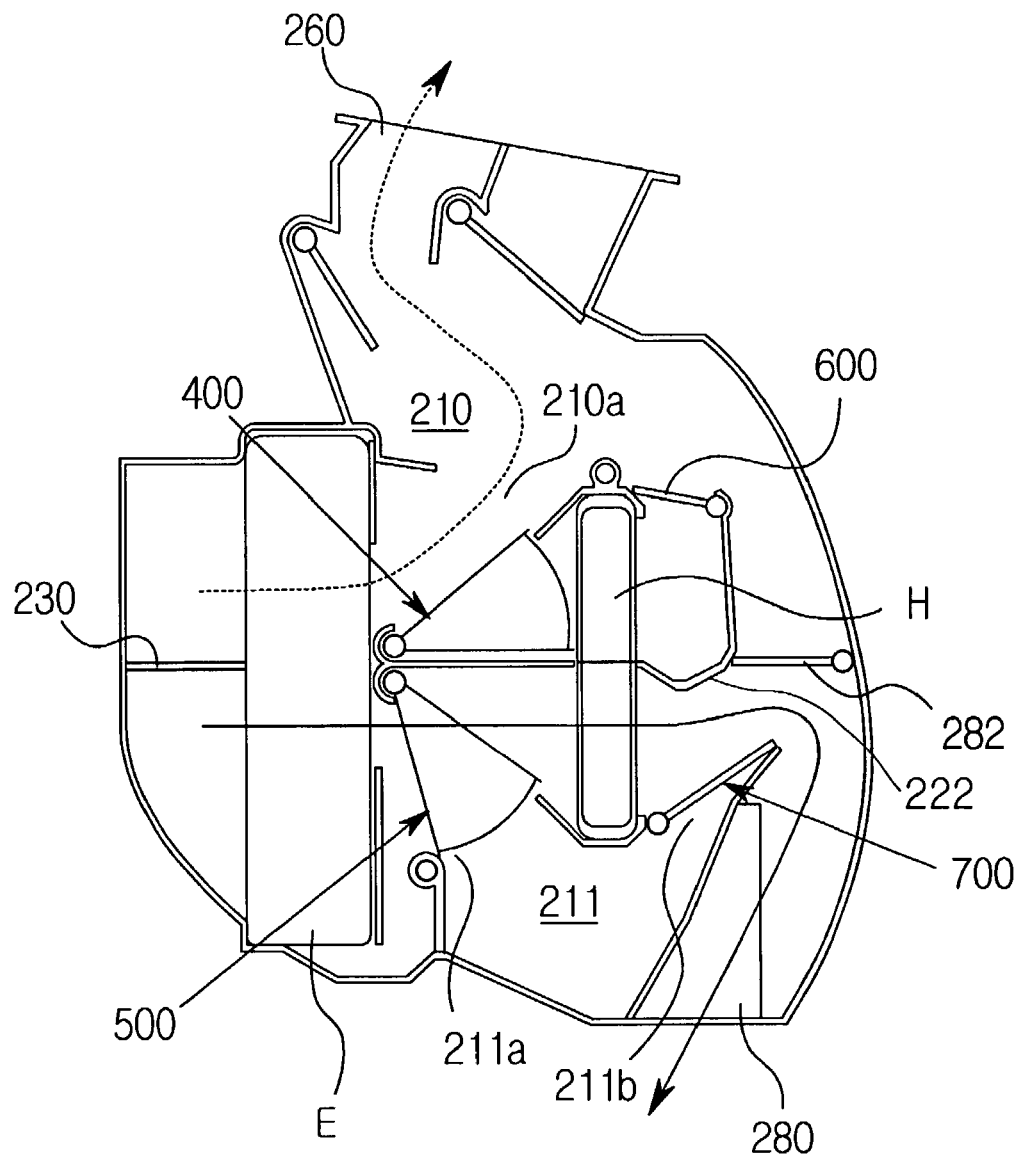
FIG. 13 is a sectional view illustrating the air conditioning system shown in FIG. 2, in which the air flow is formed in a cool-warm mix mode.

FIG. 13 shows a cool-warm mix mode. As shown in FIG. 13, upon selection of the cool-warm mix mode, both of the evaporator E and the heater core H are operated while both of the defroster opening 260 and the floor opening 280 are completely opened.

At the same time, the first temperature adjusting door 400 closes the front space of the heater core H while opening the entrance 210a of the first flow passage 210. The third temperature adjusting door 600 closes the rear space of the heater core H. The second temperature adjusting door 500 closes the entrance 211a of the second flow passage 211 while opening the front space of the heater core H. The fourth temperature adjusting door 700 closes the exit 211b of the second flow passage 211 while opening the rear space of the heater core H.

Due to the above operation, the air introduced into a space area above the partition 230 is dried while passing through the evaporator E and then ejected through the defroster opening 260 via the first flow passage 210 instead of passing through the heater core H since the air flow is blocked by the first temperature adjusting door 400.

In the meantime, the air introduced into a space area under the partition 230 is dried while passing through the evaporator E and then heated while passing through the heater core H. The heated warm air is ejected through the floor opening 280.

To more specifically describe this, for example, on a rainy day in late autumn, a driver wants to rapidly defrost the windshield while maintaining the vehicle interior warm. Then, as described above, the first and second temperature adjusting doors 400 and 500 are respectively operated so that the air dried through the evaporator E is ejected through the defroster opening 260 to rapidly remove a frost. Also, the lower air dried through the evaporator E is heated while passing through the heater core H and then ejected through the floor opening 280 into the vehicle interior to heat the vehicle interior.

That is, the defroster opening 260 supplies the dried air to rapidly remove the frost while the floor opening 280 supplies the heated air warmer than the indoor air to elevate the temperature of the vehicle interior so that the driver can feel warm.

In the meantime, the invention implements the two-layer airflow conditioning system while simultaneously blowing the cool and warm air so that the warm air is ejected through the floor opening and the cool air is ejected through the defroster opening. On the contrary, the cool air is ejected through the floor opening and the warm air is ejected through the defroster opening.

As described hereinbefore, the air conditioning system of the invention has the horizontal partition wall 220 between the evaporator E and the heater core H for dividing the internal space of the air conditioning case into the upper and lower sections so that the air in the upper section or in the lower section does not leak into the other section.

Further, the cold air and the warm air having different properties are circulated through the separate flow passages so that the warm air is supplied into the vehicle interior while the cold air is supplied to the windshield to remove the frost. On the contrary, the cold air is supplied into the vehicle interior while the warm air is supplied to the windshield.

An air conditioning system according to an alternative embodiment of the invention will be described hereinafter, in which temperature adjusting doors are modified without departing from the technical spirit of the invention.

This embodiment will adopt the same terms and reference numerals to designate the same technical means as in the above mentioned preferred embodiment.

The structure of the alternative embodiment of the invention will be described in detail with reference to the accompanying drawings.

Figure 14:
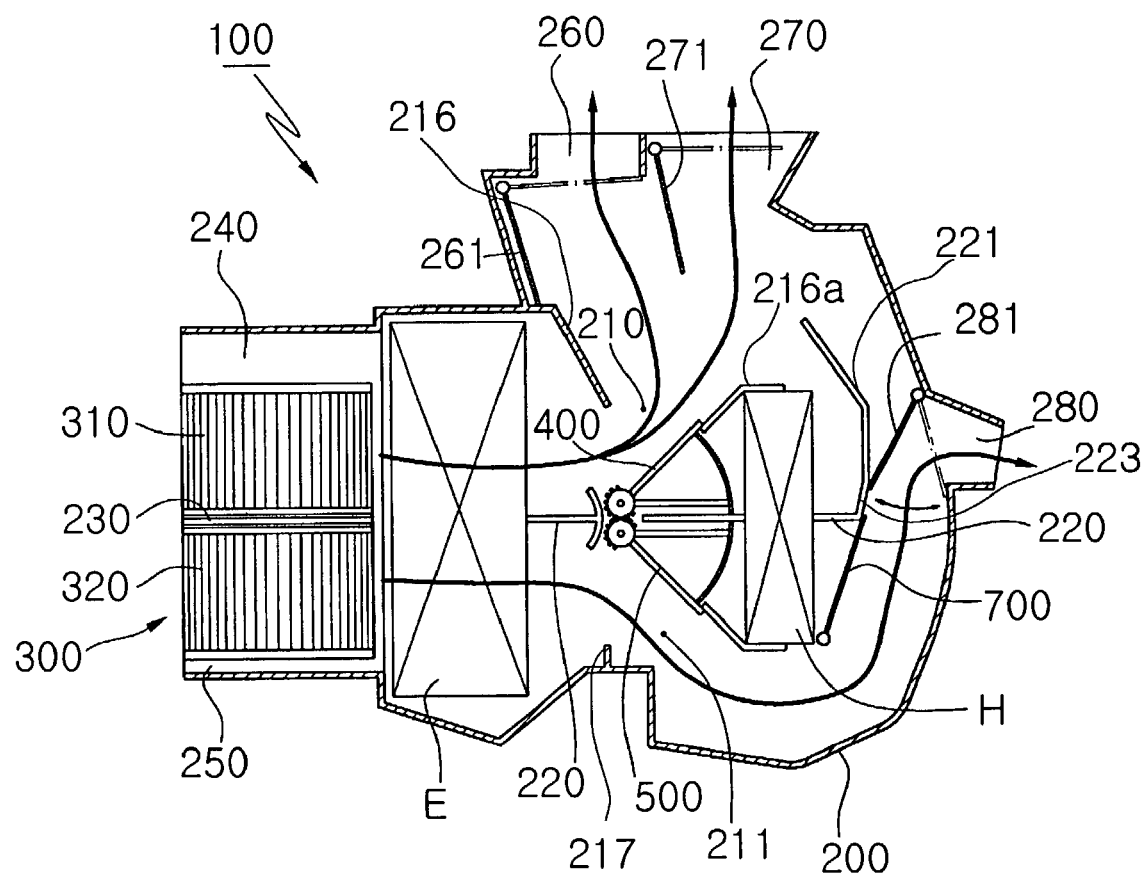
FIG. 14 is a sectional view illustrating a two-layer air conditioning system according to an alternative embodiment of the invention, in which the air flow is formed in a cool mode.
Figure 15:
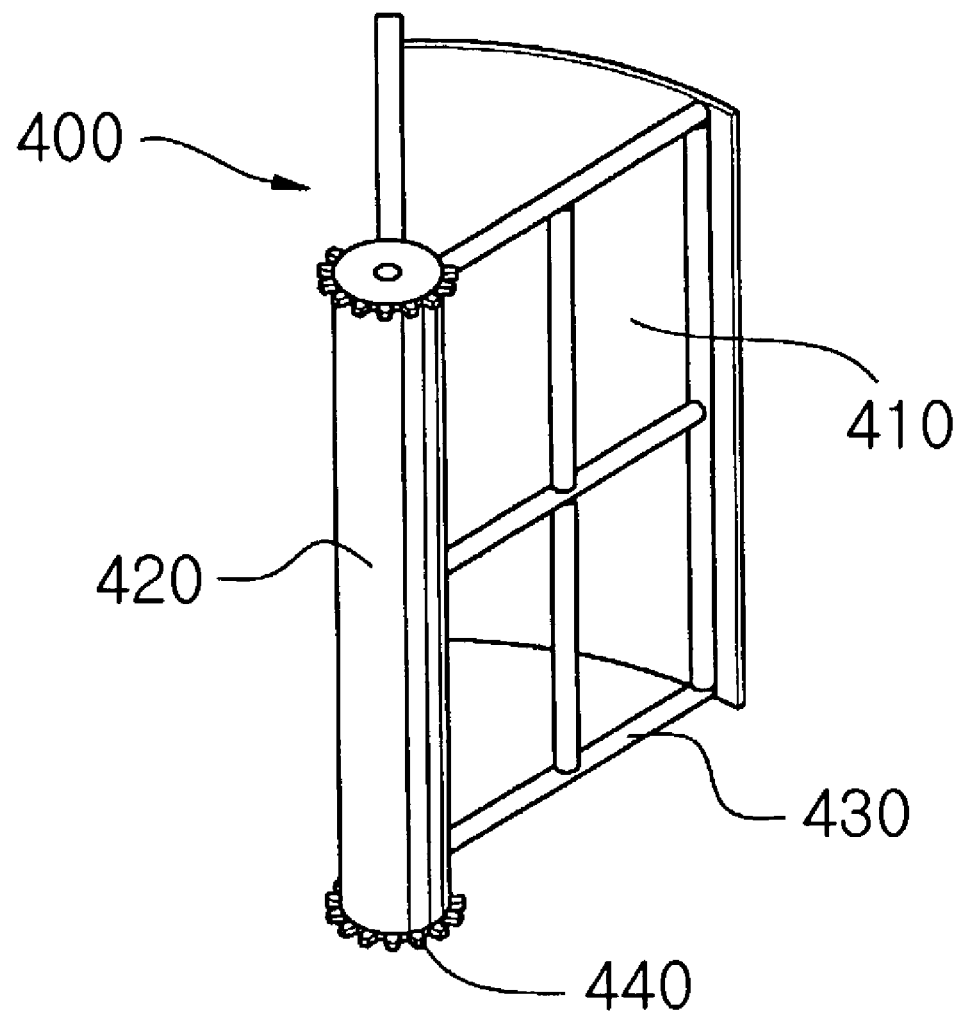
FIG. 15 is a perspective view illustrating a temperature adjusting door of the air conditioning system shown in FIG. 14.
Figure 16:
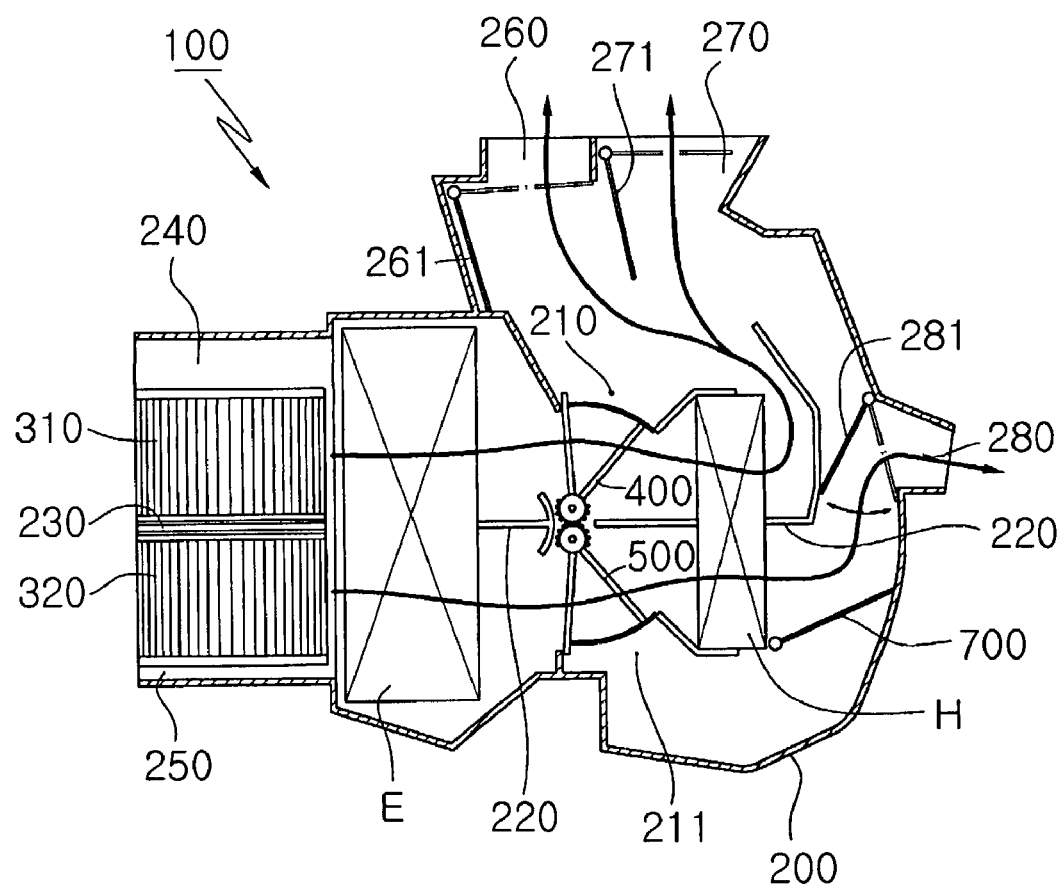
FIG. 16 is a sectional view illustrating the air conditioning system shown in FIG. 14, in which the air flow is formed in a warm mode.

FIGS. 14 to 16 are sectional views schematically illustrating the airflow in a cool and warm mode of the air conditioning system according to the alternative embodiment of the invention.

As shown in the drawings, the air conditioning system 100 has a blower fan 300 rotatably installed at an entrance of an air conditioning case 200 for forcibly supplying inflow air into a vehicle interior; an evaporator E disposed in the rear of the blower fan 300 for heat-exchanging internal and external air in a low temperature; a heater core H disposed in the rear of the evaporator in such a manner as to be spaced apart from the evaporator by a certain interval for heat-exchanging the internal and external air in a high temperature; a partition wall 220 disposed between the evaporator E and the heater core H for preventing mixture of the internal and external air simultaneously introduced through the entrance of the air conditioning case 200; first and second temperature adjusting doors 400 and 500 cooperatively installed at both sides of the partition wall 220 for selectively opening or closing a front space of the heater core H to adjust a cool and warm mode; and a third temperature adjusting door 700 disposed in the rear of the heater core H for opening and closing a rear space of the heater core H to prevent any heat-exchange between the heater core H and the air heat-exchanged in the evaporator E.

The air conditioning case 200 has the entrance at the front end of a body, in which the entrance is divided into internal and external air inlet ports 250 and 240, halved by a partition 230. In the upper portion of the air conditioning case 200, a defroster opening 260 is provided for supplying the external air toward the windshield in the vehicle interior to remove the frost formed in the windshield. On one side of the defroster opening 260, a face opening 270 is provided for supplying the internal and external air upward into the vehicle interior. In the lower portion of the air conditioning case 200, a floor opening 280 is provided for supplying the internal and external air downward into the vehicle interior. The openings 260, 270 and 280 are opened and closed by doors 261, 271 and 281.

The blower fan 300 is halved into first and second fans 320 and 310, in which the first fan 320 is installed at an internal air inlet port 250 of the air conditioning case 200 for circulating the internal air into the lower section of the air conditioning case 200, and the second fan 310 is installed at an external air inlet port 240 for supplying the external air into the vehicle interior by passing through the upper section of the air conditioning case 200.

The first and second fans 320 and 310 may be constituted of two separate blower fans, or a double-structured unitary blower fan having one body halved into two fan sections 320 and 310.

The evaporator E and the heater core H are general heat exchangers for heat-exchanging the air and thus detailed description thereof will be omitted.

The partition wall 220 for halving the internal and external air has a front end adjacent to a rear central portion of the evaporator E and extends from the rear central portion of the evaporate E via a central portion of the heater core H to the rearward of the heater core H so that the extended end is arranged toward the face opening 270 to guide the air from the heater core H to be ejected through the face opening 270 or the defroster opening 260. The partition wall 220 is arranged in the same direction as the partition 230 in the entrance of the air conditioning case 200 to naturally guide the internal and external air in heating so that the internal and external air from the evaporator can directly pass through the heater core H.

The first and second temperature adjusting doors 400 and 500 are cooperatively assembled together by interlocking means at a proper position of the partition wall 220 to selectively open/close the front space of the heater core H and first and second flow passages 210 and 211 formed above and under the heater core H.

Each of the first and second temperature adjusting doors 400 and 500, as shown in FIG. 15, has a rotary shaft 420 rotating due to power of a motor, side plate portions 430 constituted of stick-shaped frames spread from both ends of the rotary shaft 420 toward two directions with a proper angle and a shutter member 410 fixed to the ends of the side plate portions 430 for selectively closing the front space of the heater core H and the first and second flow passages 210 and 211 to block the air flow.

Each of the first and second temperature adjusting doors 400 and 500 as constructed above is fan-shaped or triangular when viewed from the side and opened between the rotary shaft 420 and the shutter member 410 when viewed from the front so that the internal and external air from the evaporator E passes through the side plate portions 430 to supply the heater core H in the warm mode while the shutter member 410 closes the first or second flow passages 210 or 211.

The interlocking means for cooperatively driving the first and second temperature adjusting doors 400 and 500 include gears 440 each provided in the rotary shafts 420 as shown in FIGS. 14 to 20. The interlocking means cooperate due to meshing of the gears 440. Alternatively, the interlocking means may cooperate with a link.

In the meantime, the third temperature adjusting door 700 is plate shaped and rotatably installed to the lower end of the rear of the heater core H for opening/closing the rear space of the heater core H so that the air flowing along the second flow passage 211 in the air conditioning case 200 under the heater core H cannot be heat-exchanged with the hot air surrounding the heater core H in the cool mode.

The operation of the above constructed air conditioning system of the invention will be described hereinafter according to the following modes.

A. Cool Mode

As shown in FIG. 14, in the cool mode, the internal and external air is supplied to the vehicle interior through the face opening 270 and the floor opening 280 to make the vehicle interior cool. The first and second temperature adjusting doors 400 and 500 close the front space of the heater core H while the third temperature adjusting door 700 closes the rear space of the heater core H.

In this mode, the external air introduced into the blower fan 300, after dropping the air temperature through heat-exchange in the evaporator E, is supplied to the vehicle interior through the first flow passage 210, and then the face opening 270. The internal air from the evaporator E flows along the second flow passage 211 and through the floor opening 280 to supply the vehicle interior for cooling the same.

At this time, the first and second temperature doors 400 and 500 are in close contact with each other to close the front space of the heater core, and the third temperature adjusting door 700 closes the rear space of the heater core H, thereby to prevent the air heat-exchanged in the evaporator E from passing through the heater core H.

In the case where the air is supplied to the vehicle interior only through the face opening 270, if the floor opening door 281 and the defroster opening door 261 are simultaneously closed, the internal and external air is mixed within the air conditioning case 200 to be ejected only through the face opening 270, thereby reducing any abrupt humidity drop due to the difference of the internal and external air humidities. This provides a comfort environment to the driver by restraining the creation of mist, which occurs frequently when there is a large difference in the internal and external air humidities.

B. Warm Mode

FIG. 16 shows a warm mode in which the first and second temperature adjusting doors 400 and 500 close the first and second flow passages 210 and 211 while opening the front space of the heater core H.

In this warm mode, the internal air introduced into the first fan 320 of the blower 300 passes through the evaporator E and is supplied to the lower portion of the heater core H under the partition wall 220. Then, after gaining the temperature through heat-exchange under a high temperature state in the heater core H, the internal air is supplied to the vehicle interior through the floor opening 280 to make the vehicle interior warm. The external air introduced into the second fan 310 passes through the evaporator E and is supplied to the upper portion of the heater core H above the partition wall 220. Then, after gaining the temperature through heat-exchange under a high temperature state in the heater core H, the external air is supplied to the vehicle interior through the defroster opening 260 or the face opening 270 to perform defogging or make the vehicle interior warm.

The partition wall 220 is installed adjacent to the evaporator E and the heater core H to prevent any mixture between the internal and external air. This completely separates the internal and external air supplied into the vehicle interior to obtain the two-layer flow.

C. Warm Floor Mode

Figure 17:
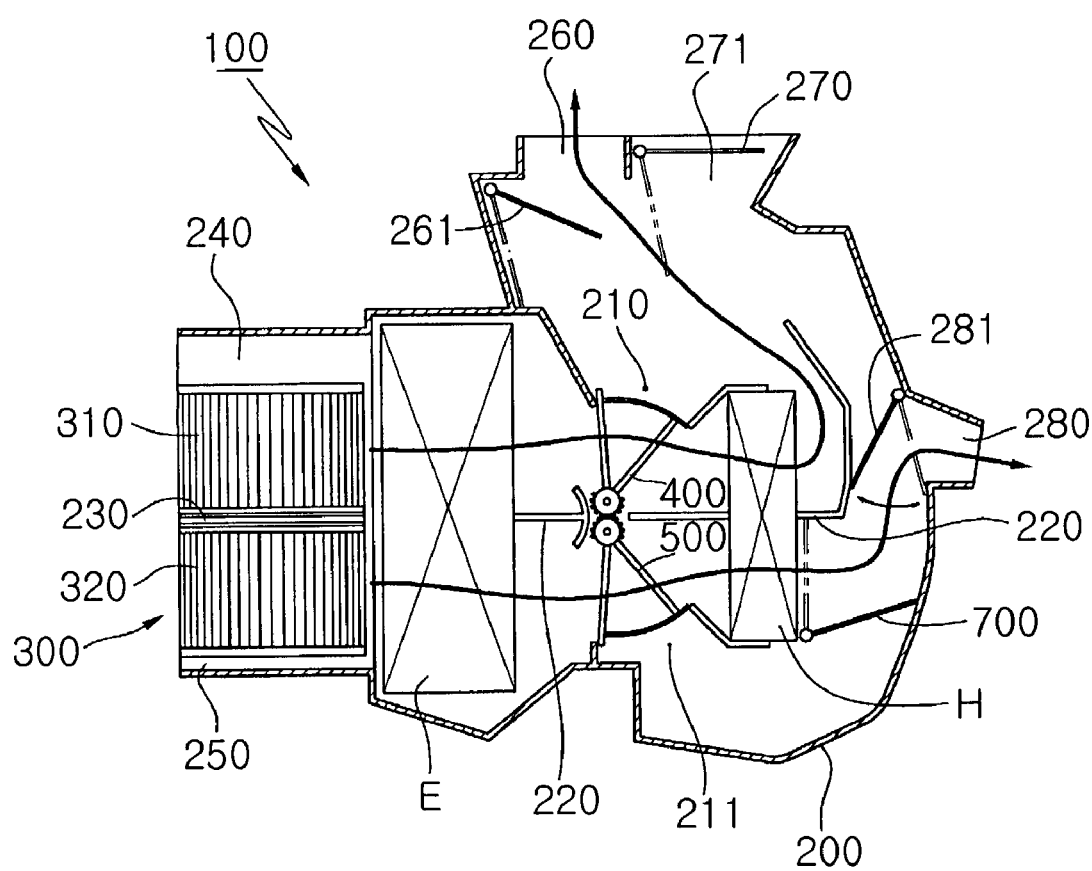
FIG. 17 is a sectional view illustrating the air conditioning system shown in FIG. 14, in which the air flow is formed in a warm floor mode in heating.

FIG. 17 shows a warm-floor mode, in which the first to third temperature adjusting doors 400, 500 and 700 open the front and rear spaces of the heater core H, the floor door 281 opens the floor opening 280, and the defroster door 261 opens the defroster opening 260 about by half so that the internal and external air from the evaporator is heat-exchanged through the heater core H and then supplied to the vehicle interior through the defroster opening 260 and the floor opening 280. The floor opening 280 supplies the air by about 70 to 80% to the vehicle interior while the defroster opening 260 supplies the air by about 20 to 30% to the vehicle interior.

D. Warm Mix Mode

Figure 18:
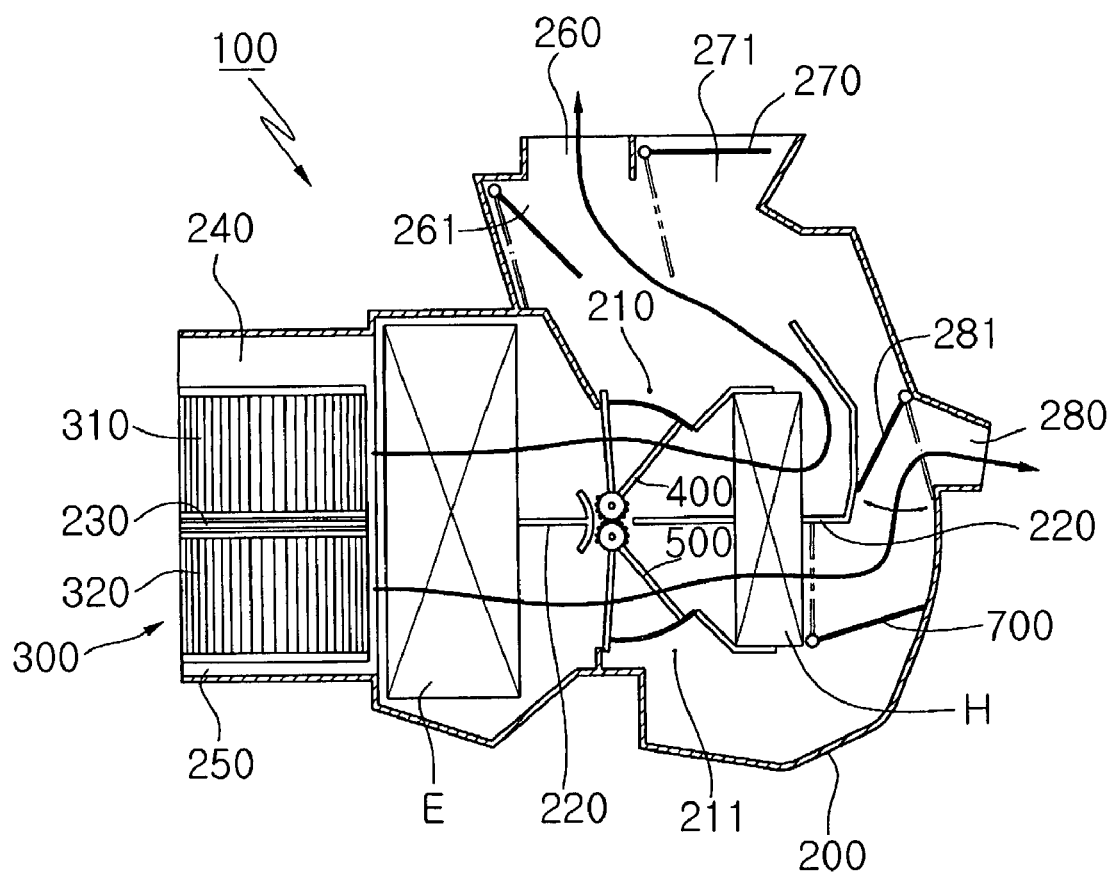
FIG. 18 is a sectional view illustrating the air conditioning system shown in FIG. 14, in which the air flow is formed in a warm mix mode in heating.

FIG. 18 shows a warm-mix mode in heating, in which all conditions are the same as in FIG. 17 except that the defroster door 261 opens the defroster opening 260 by more than half.

Therefore, the internal and external air from the evaporator E passes through the heater core H and is supplied to the vehicle interior through the defroster opening 260 and the floor opening 280, in which each of the defroster opening 260 and the floor opening 280 supplies the air by about 50% to the vehicle interior.

E. Cool Floor Mode

Figure 19:
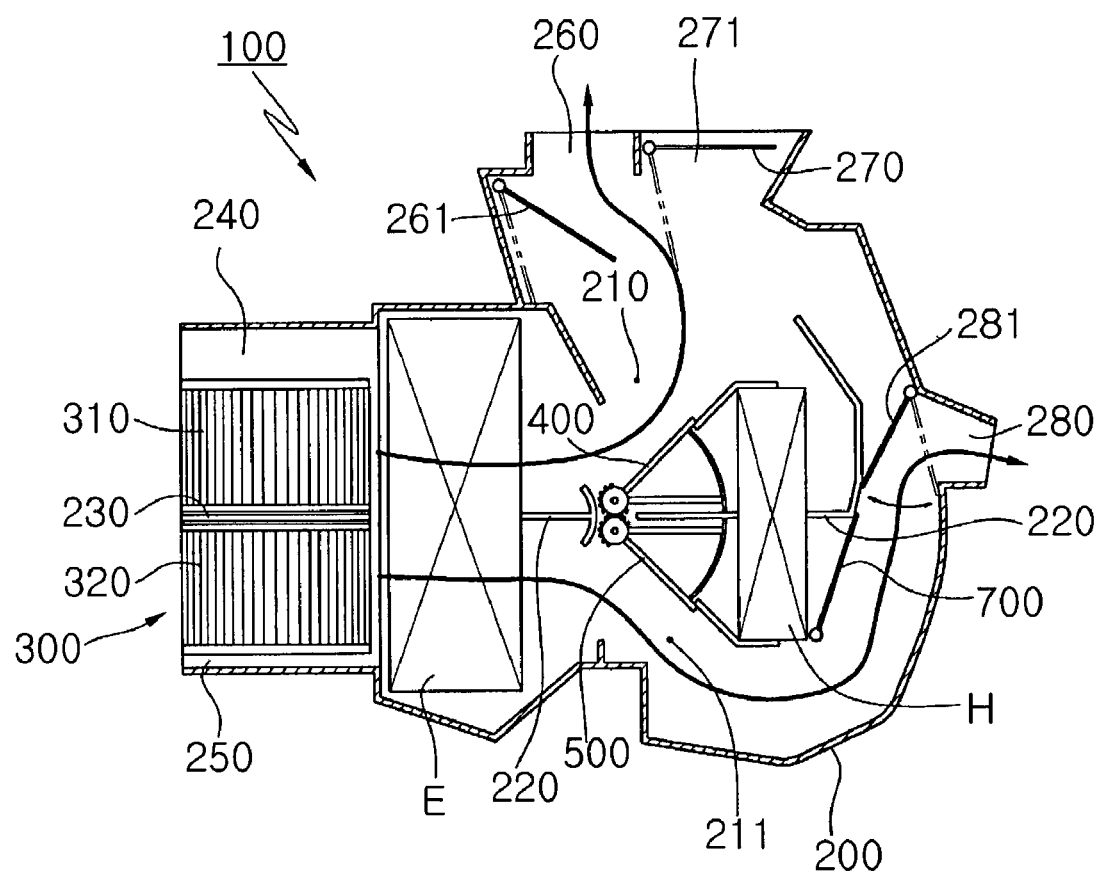
FIG. 19 is a sectional view illustrating the air conditioning system shown in FIG. 14, the air flow is formed in a cool floor mode in cooling.

FIG. 19 shows a cool-floor mode in cooling.

The first to third temperature adjusting doors 400, 500 and 700 close the front and rear spaces of the heater core H, the defroster door 261 is opened about by half, and the floor door 281 is completely opened.

Therefore, the internal and external air introduced into the first and second fans 320 and 310 passes through the evaporate E while undergoing heat-exchange under a low-temperature state in the evaporator E, flows along the first and second flow passages 210 and 211, and then is supplied to the vehicle interior through the defroster opening 260 and the floor opening 280. The floor opening 280 supplies the air by about 70 to 80% to the vehicle interior, and the defroster opening 260 supplies the air by about 20 to 30% to the vehicle interior.

F. Cool Mix Mode

Figure 20:
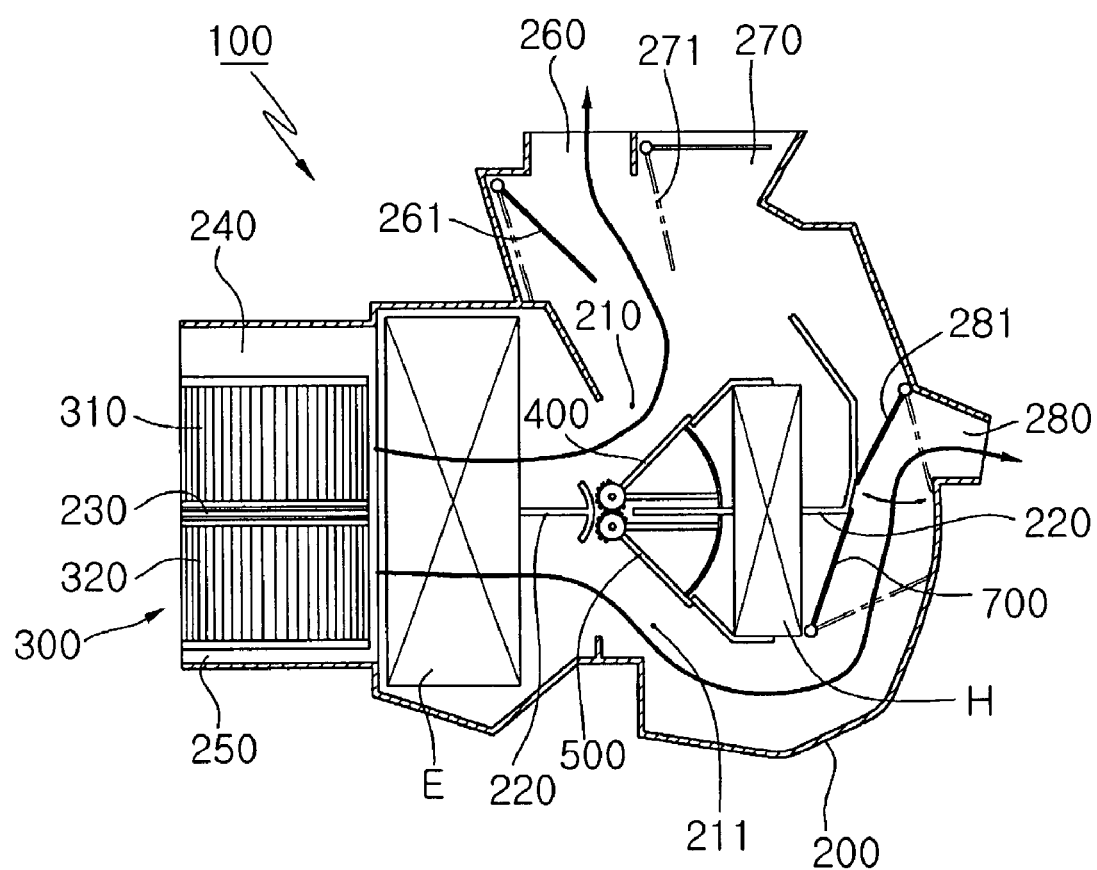
FIG. 20 is a sectional view illustrating the air conditioning system shown in FIG. 14, in which the airflow in a cool mix mode in cooling.

FIG. 20 shows a cool-mix mode in cooling, in which all conditions are the same as in FIG. 19 except that the defroster door 261 opens the defroster opening 260 by more than half.

The internal and external air from the evaporator E flows along the first and second flow passages 210 and 211 above and under the heater core H and then is supplied to the vehicle interior through the defroster opening 260 and the floor opening 280, in which each of the defroster opening 260 and the floor opening 280 supplies the air by about 50%.

As described in the above modes, the floor door 281 is positioned to open the floor opening 280 in the floor mode and the mix mode in cooling and eating. The floor door 281 of the invention as operated above has the same operating logic as a general floor door in a conventional vehicular air conditioning system and thus can be applied to an operating logic of the conventional vehicular air conditioning system.

As set forth above, according to the air conditioning system of the invention prevent, the wet internal air flowing along the lower flow passage is prevented from leaking into the upper flow passage of the external air in the mix mode so as to remove the frost with only the external air thereby enhancing the defrosting performance.

The cool air and the warm air are separately supplied to the floor opening and the defroster opening so as to free the driver or passenger from the unpleasantness due to the air supplied to the vehicle interior as well as effectively remove the frost created on a windshield.

Further, the invention may be advantageously applied with compatibility to conventional vehicles without changing the design of door operating controllers.

Although the preferred embodiments of the present invention have been disclosed for illustrative purposes on the principle of the invention, those skilled in the art will appreciate that various modifications, additions and substitutions can be made without departing from the scope and spirit of the invention as disclosed in the accompanying claims.

Therefore all of those proper changes, modification and equivalents shall be understood within the scope of the invention.

What is claimed is:

1. An air conditioning system comprising:
an air conditioning case having an entrance section divided into an external air inlet port and an internal air inlet port and an exit section which includes a defroster opening, a face opening and a floor opening;

an evaporator and a heater core provided in sequence inside said air conditioning case with certain intervals from said external and internal air inlet ports;

a partition wall extending from the rear of said evaporator via said heater core to the rear of said heater core within said air conditioning case for dividing the inside of said air conditioning case into upper and lower sections;

a blower fan having first and second fans installed on the side of said internal and external air inlet ports of the air conditioning case for forcibly blowing the internal and external air to said evaporator and said heater core;

first and second temperature adjusting doors provided respectively above and under the partition wall between said evaporator and said heater core for opening/closing a front space of said heater core; and third and fourth temperature adjusting doors provided respectively above and under said partition wall for opening/closing a rear space of said heater core, wherein each of said first and second temperature adjusting doors comprises:

a rotary shaft rotated by an actuator, wherein said shaft is immediately adjacent to and parallel to the partition wall;

fan-shaped side plates rotatably mounted on the rotary shaft in such a manner as to be spaced apart from each other by a certain interval and to extend from said rotary shaft; and an arc shaped shutter member arranged at ends of said side plates for blocking the flow of the air; and wherein each of said shutter members of the first and second temperature adjusting doors has anti-leak ribs at upper and lower ends thereof, said anti-leak ribs being superposed on baffles provided on the side of said evaporator and said heater core.

2. The air conditioning system according to claim 1, wherein said heater core is provided substantially in parallel with and spaced apart from said evaporator just rearward of said evaporator to prevent decrease in the quantity of the internal and external air.

3. The air conditioning system according to claim 1, wherein said partition wall is arranged in the same direction as a partition in the entrance section of said air conditioning case to allow the internal and external air to be guided to said evaporator and to directly pass through the heater core in heating.

4. The air conditioning system according to claim 1, wherein said partition wall has a perpendicularly extending section uprightly extending toward said face opening and a downwardly bent block in contact with a free end of said fourth temperature adjusting door.

5. The air conditioning system according to claim 1, wherein said first and second temperature adjusting doors are cooperatively assembled by interlocking means.

6. The air conditioning system according to claim 3, wherein said partition wall has a perpendicularly extending section uprightly extending toward said face opening and a downwardly bent block in contact with a free end of said fourth temperature adjusting door.

7. The air conditioning system according to claim 3, wherein said first and second temperature adjusting doors are cooperatively assembled by interlocking means.

8. The air conditioning system according to claim 1, wherein an anti-leak rib on the side of said heater core of said anti-leak ribs is shorter than an anti-leak rib on a side opposite to one on said heater core side.

9. The two-layer flow air conditioning system according to claim 1, wherein said air conditioning case has first and second temperature adjusting door mounting sections each arc-shaped along traces of said first and second temperature adjusting doors and is wider as compared with other regions of said air conditioning case.

* * * * *